(12) United States Patent
Faust et al.

(10) Patent No.: US 10,794,418 B2
(45) Date of Patent: Oct. 6, 2020

(54) BOWDEN CABLE ASSEMBLY

(71) Applicant: Brose Schliesssysteme GmbH & Co., Wuppertal (DE)

(72) Inventors: Rene Faust, Dorsten (DE); Florian Rothenberg, Wuppertal (DE); Ole Häger, Wuppertal (DE)

(73) Assignee: BROSE SCHLIESSSYSTEME GMBH & CO. KG, Wuppertal (DE)

( * ) Notice: Subject to any disclaimer, the term of this patent is extended or adjusted under 35 U.S.C. 154(b) by 0 days.

(21) Appl. No.: 16/254,139

(22) Filed: Jan. 22, 2019

(65) Prior Publication Data
US 2019/0226518 A1    Jul. 25, 2019

(30) Foreign Application Priority Data

Jan. 23, 2018 (DE) .................. 10 2018 101 448

(51) Int. Cl.
| | |
|---|---|
| *F16C 1/10* | (2006.01) |
| *E05B 79/10* | (2014.01) |
| *F16C 1/14* | (2006.01) |
| *E05B 79/20* | (2014.01) |

(52) U.S. Cl.
CPC .............. *F16C 1/145* (2013.01); *E05B 79/20* (2013.01); *F16C 1/102* (2013.01); *F16C 1/105* (2013.01); *E05Y 2900/531* (2013.01)

(58) Field of Classification Search
CPC .. F16C 1/10; F16C 1/102; F16C 1/103; F16C 1/105; F16C 1/108; F16C 1/12; F16C 1/14; F16C 1/145; F16C 1/262; E05B 79/20; E05Y 2900/531
See application file for complete search history.

(56) References Cited

U.S. PATENT DOCUMENTS

| 5,927,895 A | 7/1999 | Watanabe | |
|---|---|---|---|
| 6,971,816 B2* | 12/2005 | Miyagawa | .............. F16C 1/105 248/74.1 |
| 8,616,611 B2* | 12/2013 | Schidan | ................. B60J 5/0416 292/336.3 |

FOREIGN PATENT DOCUMENTS

| DE | 102012102450 A1 | 9/2013 | |
|---|---|---|---|
| DE | 202016102209 U1 * | 7/2017 | ............ E05B 79/20 |

(Continued)

OTHER PUBLICATIONS

German Patent Office, German Search Report for German Application No. 102018101448.1 dated Nov. 13, 2018.

*Primary Examiner* — Adam D Rogers
(74) *Attorney, Agent, or Firm* — Lorenz & Kopf, LLP

(57) ABSTRACT

A Bowden cable end piece that facilitates the connection of a Bowden cable to an operating mechanism is disclosed. The end piece includes an elongated frame having a receptacle configured to receive a sheath of a Bowden cable and guide a core of a Bowden cable. The frame has a barrel guide configured to receive a barrel formed on an end of the core. An attachment member on a first end of the frame provides a holding connection with the operating mechanism in an insertion position and an end position. A mounting spring on a second end of the frame has an abutment region configured to abut a mounting surface on a support structure when the Bowden cable end piece is installed in the end position. The Bowden cable end piece can be, in the installed state, pressably attached by the mounting spring in the end position.

20 Claims, 12 Drawing Sheets

(56) References Cited

FOREIGN PATENT DOCUMENTS

DE     102017108921 A1    10/2018
KR     1020070048310 A    5/2007

\* cited by examiner

BOWDEN CABLE ASSEMBLY

CROSS-REFERENCE TO RELATED APPLICATION

This application claims priority to German Patent Application No. 10 2018 101 448.1, filed Jan. 23, 2018, which is incorporated herein by reference in its entirety.

TECHNICAL FIELD

The present disclosure relates to mounting of a Bowden cable end piece, and more particularly to a Bowden cable end piece, a lock mechanism, a handle module, an interior door liner, a door module and a method for mounting a Bowden cable end piece for a motor vehicle door handle.

BACKGROUND

Bowden cables are used in motor vehicles, for example, for transmission of actuation forces in door handles and door locks. The usually flexible Bowden cables are arranged, for example, in the motor vehicle door construction and serve the connection between door handle and door lock. To facilitate the assembly of the vehicle door, a Bowden cable can be connected at one end to the door handle, before the door handle is mounted on a support structure of the motor vehicle door together with the interior lining of the motor vehicle door. For a connection of the Bowden cable to the door handle, a Bowden cable end piece is provided which is mounted to the door handle prior to assembly of the interior lining. However, it has been shown that the mounting of the Bowden cable end piece on the door handle requires additional mounting procedures. Accordingly, there is a need in the art to simplify the connection of the Bowden cable with the door handle.

SUMMARY

In accordance with the present disclosure, various embodiments for a Bowden cable end piece and a method for mounting a Bowden cable end piece for a motor vehicle door handle is disclosed. For example, a Bowden cable end piece is provided for a motor vehicle door handle. The Bowden cable end piece includes an elongated support structure with a Bowden cable receptacle for receiving a sheath of a Bowden cable and for through guidance of a core of a Bowden cable, and with a barrel guide for a barrel of a Bowden cable, which barrel is attached to one end of a core. For an insertion position and an end position, at a first end portion of the support structure, an attachment member for a holding connection with a door handle mechanism is provided. At a second end region opposite to the first end region, a mounting spring is provided which has an abutment region configured to, when installed, abut on a mounting surface of a support bearing structure of a motor vehicle door. For an end position, the Bowden cable end piece in the installed state is pressably attachable by the mounting spring into the end position.

The attachment member can also be referred to as an attachment guidance or simply an attachment.

In an example, the opposite region is a second end region.

For example, the holding connection can be configured as a positive-locking connection. A positive-locking connection provides a secure hold and a controlled mounting. However, the holding connection can also be configured for a frictional connection, for example by pressing a guidance into a tapered groove.

The mounting surface of a support structure of a motor vehicle door is, for example, a door panel.

In an example, the barrel guide forms a stop for the barrel in pulling direction of the Bowden cable. With the stop providing a defined position of the barrel.

The term "motor vehicle door handle" refers to handles on doors of motor vehicles. The term "door" refers to motor vehicle doors, e.g. pivoting or sliding doors, or gullwing doors, but also includes motor vehicle flaps, motor vehicle covers or motor vehicle hoods, such as tailgates, trunk lids or hoods. The term "door handle" therefore also includes handles, i.e. handles and actuators of motor vehicle flaps, motor vehicle covers or motor vehicle hoods.

The term "Bowden cable end piece" refers to a support structure provided at the end of a Bowden cable. The support structure serves to connect the Bowden cable with a component, such as a lock or handle construction. In this case, a Bowden cable sheath is held supported by a Bowden cable receptacle and a core extending in the sheath exits from the sheath (and the Bowden cable receptacle) movably to be connected to a power transmission element of the lock- or handle-construction. The Bowden cable end piece serves essentially the attachment of the Bowden cable receptacle on the lock or handle construction. Thus, in the fixed state the Bowden cable end piece offers the fixed counter support, by which the Bowden cable sheath is supported, so that with the core of the Bowden cable tensile forces can be transmitted.

For example, the elongated support structure of the Bowden cable end piece may be configured as a kind of insert, such as an elongated frame-like structure, to be inserted into a receptacle at the counter support, i.e. the lock- or handle-construction.

The Bowden cable end piece serves the attachment of the Bowden cable to, for example, a functional part or a component of a motor vehicle lock. With the Bowden cable end piece, the Bowden cable is attached to a door lock, a door handle or another actuator unit.

The holding connection at the one end portion serves on the one hand for the temporary fixation of the Bowden cable end piece to the mounting structure, i.e. the door handle mechanism. In other words, for temporary holding in the insertion position during the subsequent mounting steps. On the other hand, the holding connection also serves the permanent attachment in the installed state for holding in the end position. The mounting spring also serves the permanent attachment in the installed state, which, together with the holding connection, ensures that the Bowden cable end piece is permanently held during operation of the vehicle. In the permanent attachment in the installed state, for example, only a holding connection is provided and for the second attachment, only a pressing abutment is provided by the mounting spring.

For mounting, initially only a one-sided attachment of the Bowden cable end piece is provided. Such a one-sided attachment is insufficient for the operation of a vehicle. The Bowden cable end piece is thus held in the insertion position. However, during mounting, the support is sufficient and ensures that the Bowden cable end piece is in the correct position. For the end position, a second attachment of the Bowden cable end piece is provided. This is done by the abutting of the mounting spring against a mounting surface of a support structure and requires no further mounting step, since the abutting is carried out by further attachment steps, which are provided anyway when assembling a door. For example, the door handle with preassembled Bowden cable end piece is attached to an interior door liner, which is then attached to a support structure of the door. In this attachment, the abutting of the mounting spring then takes place on the mounting surface of the support structure.

The Bowden cable end piece can also be referred to as motor vehicle lock Bowden cable holder, Bowden cable mount or Bowden cable holding device.

The term "door handle mechanism" refers to a structure of the door handle device to which the Bowden cable end piece can be attached to be held securely and to allow the power transmission.

The term "support structure" of the Bowden cable end piece refers to a structure, for example a kind of frame, which is configured for mounting on the door handle mechanism. The holding structure can also be configured as a kind of container or housing. For example, the support structure may enclose a motion space in which the core end piece, can move in conjunction, i.e. engagement, with a power transmission element of the door handle.

The "attachment for a holding connection" is used for pre-assembly of the Bowden cable end piece, for example on a door handle. The "attachment for a holding connection" in this function may also be referred to as a pre-assembly holder. In other words, a device which is intended to hold the Bowden cable end piece for the purpose of pre-assembly. The pre-assembly in the proposed Bowden cable is thus also used for the attachment of the Bowden cable on a further component, e.g. the door handle, a door lock or an actuator.

The "attachment for a holding connection" ensures the holding of the Bowden cable end piece in a pre-assembly position. The term "pre-assembly position" refers to the usual assembly processes in which individual elements, components or parts are partly pre-assembled, e.g. partially assembled or attached together. These steps occur, for example, when supplying the element. The pre-assembly can be done in several steps. In a Bowden cable, for example, the core with firmly mounted core end piece is already inserted in the Bowden cable sheath (also called sheath) by the manufacturer of the core. If two firmly mounted core end pieces are provided, insertion into the sheath is done prior to the determination of the second core end piece. A Bowden cable (core and sheath) can also already be connected to another component in the pre-assembly, e.g. with a door handle so as to be delivered to another station of mounting to the finished motor vehicle. The term "pre-assembly position" thus also refers to the delivery of the door handle with preassembled Bowden cable for another assembly step. For example, the Bowden cable can be connected to the door handle and another part, e.g. a door lock, an actuator or for connecting or coupling to another Bowden cable.

The "attachment for a holding connection" ensures, together with the mounting spring, also the holding of the Bowden cable end piece in the final mounting position.

It is noted that the spatial position of the Bowden cable end piece in the pre-assembly position, i.e. the insertion position, can match with the spatial position of the Bowden cable end piece in the final mounting position, i.e. the end position. The difference, however, lies in the mount in these two positions. In the pre-assembly position, the Bowden cable end piece has no function and will only work in the final mounting position.

According to an example, a Bowden cable with a sheath and a core is provided which includes a barrel at one end. The sheath is held at one end in the Bowden cable receptacle, and the core is guided through the Bowden cable receptacle. The barrel is kept movably guided in the barrel guide.

In one option, the barrel guide forms a stop for the barrel in the pulling direction of the Bowden cable. With the stop a defined position of the barrel is given.

The Bowden cable can also be referred to as adjustment device. In an example, the core is a tensile element, e.g. provided in the form of a cable. The cable may also be made of other material, e.g. fibers made of plastic, or e.g. also made of carbon- or aramid fibers. In another example, the core is configured as a tensile and compressive element. The core may be a spring steel wire, which is elastically bendable to some extent and is suitable for guiding in a Bowden cable, which can be installed, for example, extending in a curved manner. For example, the core is equipped with a core end piece at one or both ends. For example, as a core end piece, a connector is provided which can be hung in a suspension to transmit power. The connector may be a barrel, a ball or a hook or an eyelet which is pressed, molded or crimped onto the end of the core, e.g. the cable end. The core may include several steel strands and coated with a coating.

The Bowden cable connection is an adjustment element, adjustment device, actuating element or actuating device of a door handle or a motor vehicle lock. The term actuating refers, for example, to the opening of the motor vehicle lock by actuating the door handle. The term adjustment refers to unlocking and locking the door, or the door lock. The Bowden cable connection is for example part of a locking/unlocking element for a movable vehicle component, e.g. a lock mechanism for a motor vehicle door.

The Bowden cable connection is used for the power transmission for actuation of a motor vehicle lock. For example, an actuator element is provided which is used to transmit an actuating force to the motor vehicle lock. The actuating element is for example a handle, lever or actuator in order to generate or apply the adjusting force. The actuator element can transmit a manually applied force with an inside or outside handle. The actuator element may alternatively or additionally also transmit a force applied by an actuator, for example, the force generated by an actuating drive such as an electric or electromechanical actuating motor.

The stop is, referring to the core, a proximal stop in pulling direction of the Bowden cable. Pulling direction means that at the end of the Bowden cable opposite the barrel, i.e. the core, a tensile force is applied.

The barrel forms a core end piece of the Bowden cable. Instead of a barrel shape, the barrel can also have another shape as a core end piece. The core end piece is applied onto the core at a core end. The core is suspended for power transmission with the core end piece in a suspension device of a coupling element, such as a barrel receptacle of an operating lever of a handle. Tensile forces can then be transmitted with the core.

The Bowden cable end piece is provided for example for blind mounting. According to an example, the Bowden cable end piece includes a guide element for blind mounting. In one option, the guide element includes a linear installation direction. The term "blind assembly" refers to a guidance that allows only a single joining of components during assembly, hence only a clear mounting position. Another holding mounting of the parts is not possible.

According to an example, the attachment for the holding connection with the door handle mechanism includes a snap fit and/or catch mechanism, with which the Bowden cable end piece, in an insertion position, is held captively on the door handle mechanism.

The term "insertion position" refers to the state when the Bowden cable end piece is held but is held only on one side by the positive-locking connection.

According to an example, the mounting spring is configured for an elastic deformation, such that it is ensured that in the installed state, the mounting spring exerts pressure on the Bowden cable end piece. The elastic deformation ensures that continuous, i.e. always pressure is exerted to allow the Bowden cable end piece to be held in the desired installed position, i.e. end position.

According to an example, the mounting spring is provided on the Bowden cable end piece.

In one option, the mounting spring is configured for a linear installation direction of the Bowden cable end piece in a receptacle of a door handle mechanism. For example, the mounting spring is integrally formed on the Bowden cable end piece.

According to an example, the mounting spring is relaxed in the insertion position and pressed in the end position.

According to an example, the mounting spring protrudes arcuately from the Bowden cable end piece. In one option, the arcuate protrusion prevents the assembly spring element from being inserted into a groove or slot on a door handle mechanism.

According to an example, the mounting spring at its free end includes a stopper segment, which is pressable against the door handle mechanism in the installed state by abutting of the mounting spring on a contact surface.

The stopper segment enhances the spring effect, since an arc is formed, which bears against one end and holds or pushes the Bowden cable end piece into position with the other end.

In an example, the mounting spring includes two arc elements as spring contact elements, which protrude in longitudinal direction at the end of the support structure.

The Bowden cable end piece includes stop elements on the support structure, which are configured to abut in the installed state on contact surfaces of the counterpart, i.e. at abutment regions of the door handle mechanism.

The door handle mechanism includes, for example, an insertion opening into which the Bowden cable end piece is inserted. In the area of the insertion opening, a bar-shaped connecting element of the door handle mechanism may be provided, which engages with the barrel when the Bowden cable end piece is used, so that actuating forces are can be transmitted via the Bowden cable at least in pulling direction.

In another example, the mounting spring is provided on a mounting surface of a support structure of a motor vehicle door, for example on a door panel. For example, the door panel is formed with a spring which holds the Bowden cable end piece in its end position.

In accordance with another aspect of the present disclosure, a lock mechanism is provided for a motor vehicle door. The lock mechanism includes a motor vehicle door lock and a Bowden cable end piece as further described herein. The Bowden cable of the Bowden cable end piece is connected at its end, which is opposite to the Bowden cable end piece, with the vehicle door lock. The lock mechanism for a motor vehicle door can also be referred to as a motor vehicle door lock mechanism.

In accordance with another aspect of the present disclosure, a handle module for a motor vehicle door is provided. The handle module includes a door handle mechanism of a motor vehicle door and a Bowden cable end piece as further described herein. The Bowden cable end piece is captively secured to the door handle mechanism. The handle module for a motor vehicle door may also be referred to as a motor vehicle door handle module.

In an example, the door handle mechanism includes an inner handle, and the Bowden cable end piece is connected to a mount of the inner handle and the Bowden cable is actuatable via the inner handle for transmitting an actuating force from the inner handle to a door lock.

In another example, the door handle mechanism includes an outer handle, and the Bowden cable end piece is connected to a mount of the outer handle and the Bowden cable is actuatable via the outer handle for transmitting an actuating force from the outer handle to a door lock.

In an example, a handle/lock mechanism is provided in which the Bowden cable is connected to a motor vehicle door lock and the Bowden cable end piece is attached to an inner handle or outer handle.

According to an example, the Bowden cable end piece is inserted into a receptacle of the door handle mechanism. At the Bowden cable end piece and/or the receptacle a counter support is provided which forms a stop for the inserted Bowden cable end piece, wherein the stop defines the end position.

In an example, the Bowden cable end piece is inserted into a receptacle of the lock structure. At the Bowden cable end piece and/or the receptacle, a counter support is provided which forms a stop for the inserted Bowden cable end piece, wherein the stop defines the end position.

According to the present disclosure, an interior door liner for a motor vehicle door is also provided. The interior door liner includes a door handle mechanism of a motor vehicle door and an interior lining segment of a motor vehicle door and a Bowden cable end piece as further described herein. The Bowden cable end piece is held captively on the door handle mechanism and the door handle mechanism is attached to the interior lining segment. The interior door liner is mountable with a mounting side on a flange-like mounting surface of a support structure of a motor vehicle door. The Bowden cable end piece is inserted into a receptacle of the door handle mechanism such that the mounting spring member protrudes on the mounting side of the Bowden cable end piece to abut when mounting the interior lining segment on the mounting surface. The interior door liner for a motor vehicle door may also be referred to as an interior lining panel or segment. In an example, the flange-like mounting surface is a door panel, for example, a door frame panel.

According to the present disclosure, also a door module for a motor vehicle door is provided. The door module, includes a support structure of a motor vehicle door with at least one flange-like mounting surface and an interior door liner according to the preceding example. The interior door liner is mounted to the flange-like mounting surface of the support structure. The mounting spring abuts against the mounting surface and holds the Bowden cable end piece pressed in the end position. In an example, the mounting spring member is permanently pressurized by the door panel in the assembled state, i.e. the mounting spring is always over pressed.

When fully assembled, the Bowden cable end piece, i.e. the support structure, is held on the one hand by the holding connection to the door handle mechanism and on the other hand, the Bowden cable end piece, i.e. the holding structure, is held by the mounting spring in its end position.

According to the present disclosure, a method for mounting a Bowden cable end piece for a motor vehicle door handle is provided. A Bowden cable is provided with a sheath and a core with a barrel and a Bowden cable end piece with an elongated support structure comprising a Bowden cable receptacle in which the sheath of the Bowden cable is held and through which the core of the Bowden cable extends. The support structure includes a barrel guide, in which the barrel is held movably guided. The Bowden cable end piece is attached in an insertion position with an attachment, provided at a first end portion of the support structure, to a door handle mechanism. The Bowden cable end piece is inserted into a receptacle of the door handle mechanism such that a mounting spring of the Bowden cable end piece protrudes from the Bowden cable end piece. The door handle mechanism is attached to an interior lining segment of a motor vehicle door. The mounting spring member protrudes from the Bowden cable end piece on a mounting side of the interior lining segment. The interior door liner is attached with the mounting side to a flange-like mounting surface of a support structure of a vehicle door. The mounting spring abuts on the mounting surface and the Bowden cable end piece is held pressed in an end position.

According to an aspect of the present disclosure, a Bowden cable end piece is provided, which is first provisionally fixed in a pre-assembly to the counterpart, by attaching the Bowden cable such that it is not sufficiently attached for permanent operation, since the fixation is made only at one end of the holding structure of Bowden cable end piece. The sufficient hold, i.e. permanent attachment is accomplished by providing an additional element, i.e. a mounting spring, which does not require a separate installation step during pre-assembly. The additional element abuts in the assembled state on a surface and thus holds the Bowden cable end piece also at the second end.

It should be noted that the assembly of the Bowden cable end piece is described in various examples in relation with the attachment of the Bowden cable end piece on a motor vehicle door handle. In other examples, it is provided that the Bowden cable end piece takes place on a motor vehicle door component, for example, except on a motor vehicle door handle on a motor vehicle door lock and/or an actuator or other control element of a motor vehicle door lock system.

In an example, a Bowden cable end piece for a motor vehicle door component is provided. The Bowden cable end piece includes an elongated support structure with a Bowden cable receptacle for receiving a sheath of a Bowden cable and for through guidance of a core of a Bowden cable, and with a barrel guide for a barrel of a of a Bowden cable, which barrel is attached to one end of a core of a of a Bowden cable. For an insertion position and an end position, at a first end portion of the support structure an attachment for a holding connection with a door handle mechanism is provided. At a second region opposite the first end region, a mounting spring is provided which includes an abutment region which is configured to abut, when installed, against a mounting surface of a support structure of a motor vehicle door. The Bowden cable end piece, for an end position, in the installed state is pressed attachable by the mounting spring in the end position.

It should be noted that the features of the embodiments of the Bowden cable end piece also apply to embodiments of the lock mechanism, the handle module, the interior door liner, the door module and the method for mounting a Bowden cable end piece for a motor vehicle door handle and vice versa. In addition, those features can be freely combined with each other, where this is not explicitly mentioned.

BRIEF DESCRIPTION OF THE DRAWINGS

The present disclosure will hereinafter be described in conjunction with the following drawing figures, wherein like numerals denote like elements.

DETAILED DESCRIPTION

Figure 1:
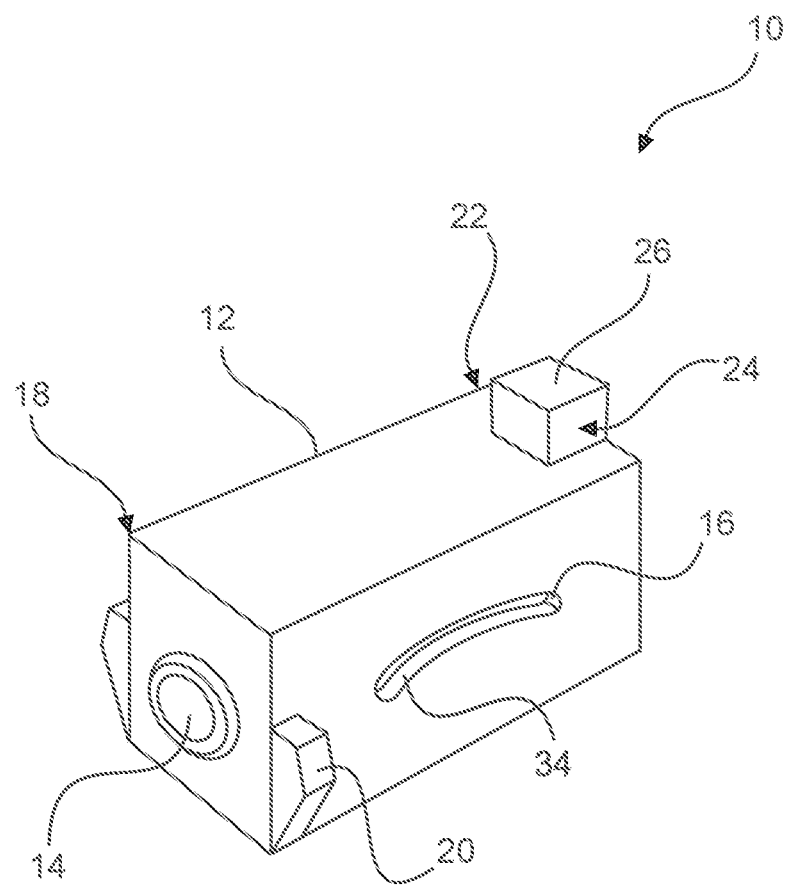
FIG. 1 shows a perspective view of an example of a Bowden cable end piece with a mounting spring.

FIG. 1 shows a Bowden cable end piece 10 for a motor vehicle door handle. The Bowden cable end piece 10 includes an elongated frame or support structure 12 with a Bowden cable receptacle 14 for receiving a sheath of a Bowden cable and for through guidance of a core of a Bowden cable. The elongated frame 12 also includes a barrel guide 16 for guiding a barrel of a Bowden cable attached to one end of a core. For an insertion position and an end position, at a first end portion 18 of the frame 12 an attachment 20 for a holding connection with a door handle mechanism is provided. At a second region 22 opposite to the first end region 18, a mounting spring 24 is provided, which has an abutment region 26 which is configured to, when installed, abut on a mounting surface of a support structure of a motor vehicle door. For an end position in the installed state, the Bowden cable end piece 10 can be pressed by the mounting spring member 24 into the end position.

Figure 2:
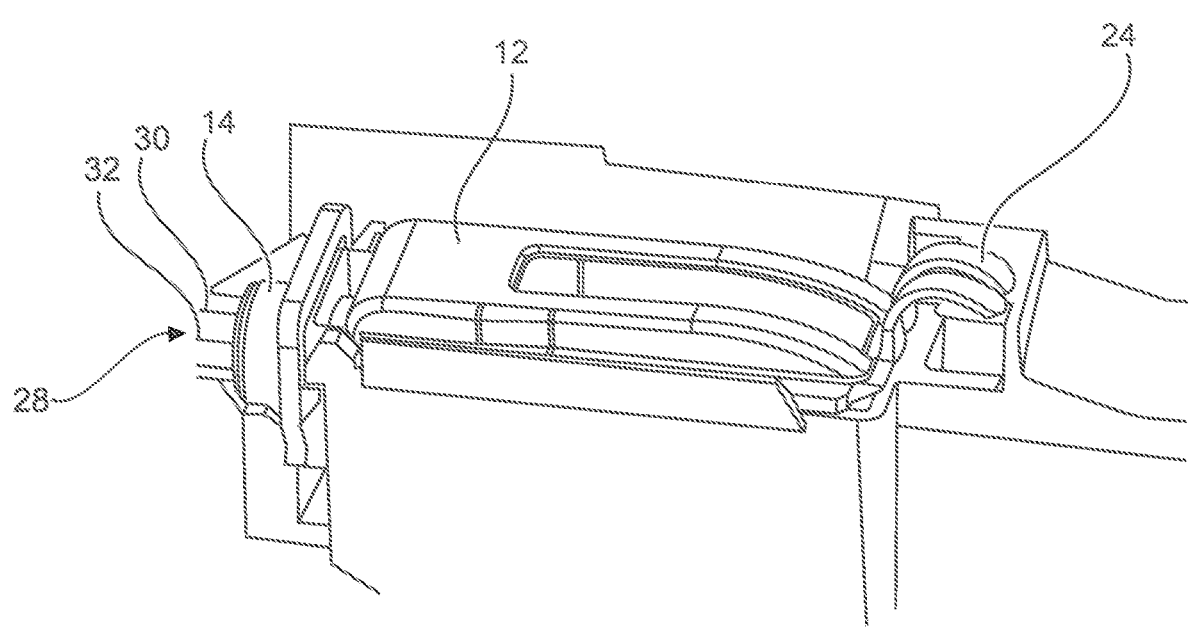
FIG. 2 shows a perspective view of another example of a Bowden cable end piece in a pre-assembled state.

FIG. 2 shows a perspective view of another example of the Bowden cable end piece 10, as an option in a pre-assembled state in a receptacle of another component, for example a handle structure. In the example in FIG. 2, a Bowden cable 28 (see also FIG. 3 or FIG. 4) is indicated, which includes a sheath 30 and a core 32. The core 32 includes a barrel 34 at one end (see FIG. 3). The sheath 30 is held at one end in the Bowden cable receptacle 14, and the core 32 is guided by the Bowden cable receptacle 14. The barrel 34 is kept movably guided in the barrel guide 16. As an option, it is provided that the barrel guide forms a stop 36 for the barrel 34 in pulling direction of the Bowden cable (see FIG. 4). With the stop 36, a defined position of the barrel 34 is given, which simplifies the mounting with a power transmission element of the handle.

Figure 3:
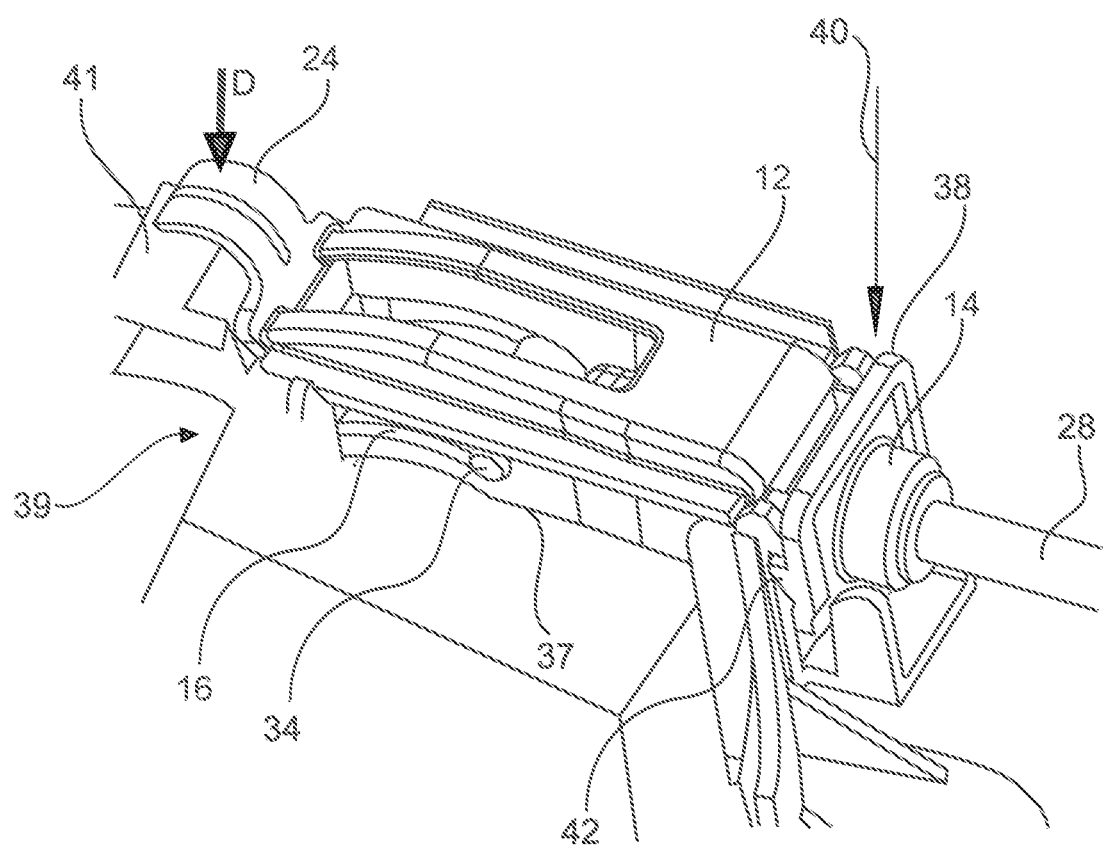
FIG. 3 shows a further perspective view of the example of FIG. 2.

FIG. 3 shows an example of the Bowden cable end piece 10, which includes a guide element 38 for blind mounting. As an option, it is provided that the guide element 38 includes a linear installation direction 40. For a pre-assembly, the Bowden cable end piece 10 can be inserted, for example, only linearly from above into the guide element 38.

As a further option, it is provided that the mounting spring 24 is configured for a linear installation direction of the Bowden cable end piece in a receptacle 37 of a door handle mechanism 39. For this purpose, the mounting spring 24 can be pressurized in the end position in the linear direction.

As a further option, it is also shown in FIG. 3 that the attachment for the holding connection 20 with the door handle mechanism includes a snap fit mechanism 42 and/or catch mechanism with which the Bowden cable end piece 10 can be attached captively in an insertion position to the door handle mechanism.

The Bowden cable end piece 10 in FIG. 3 is inserted in the receptacle 37 of the door handle mechanism 39, that is shown in the pre-assembly or installation position. The mounting spring 24 abuts against a contact surface 41 or is located at least near to the contact surface 41, such that a fixed installation position of the Bowden cable end piece 10 is ensured by pressing on the mounting spring 24 in the finished installation. The pressing on the mounting spring 24 takes place in the installed state by abutting of a mounting surface, not shown, of a supporting structure of a motor vehicle door, wherein the mounting surface exerts pressure on the mounting spring 24. The pressure in the installed state in the end position is shown symbolically with an arrow D.

In an example, the mounting spring 24 may be configured for elastic deformation, such that it is ensured that the mounting spring in the installed state always exerts pressure on the Bowden cable end piece. As a further option, the mounting spring 24 may be provided on the Bowden cable end piece 10. In an option, the mounting spring 24 may be provided separately. In an example, the mounting spring 24 is relaxed in the insertion position. In the end position, however, the mounting spring 24 is pressed.

As a further option, the mounting spring 24 protrudes arcuately 44 from the Bowden cable end piece 10. In another option, the arcuate protrusion prevents the mounting spring from being inserted into a groove or slot on a door handle mechanism.

Figure 4:
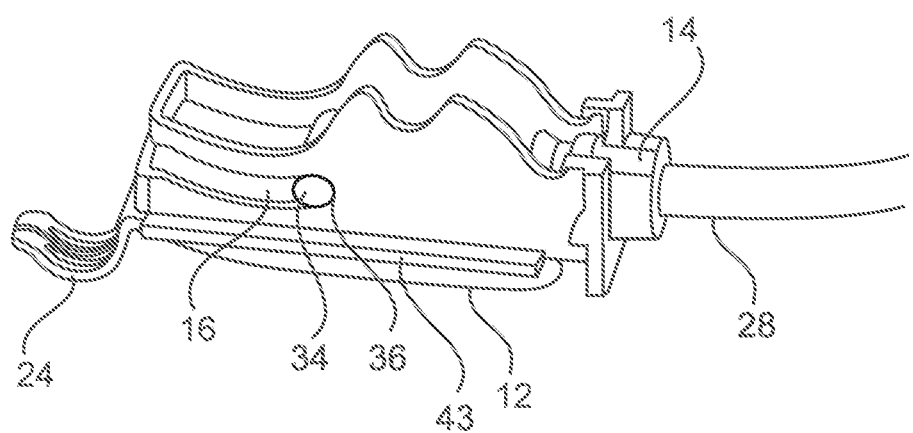
FIG. 4 shows a perspective view of another example of a Bowden cable end piece.

FIG. 4 shows the Bowden cable end piece 10 from the other side. As an option, a stop 43 is provided, which is provided to abut against a counterpart, for example, the door handle mechanism, and thus to allow the definition of an end position.

Figure 5:
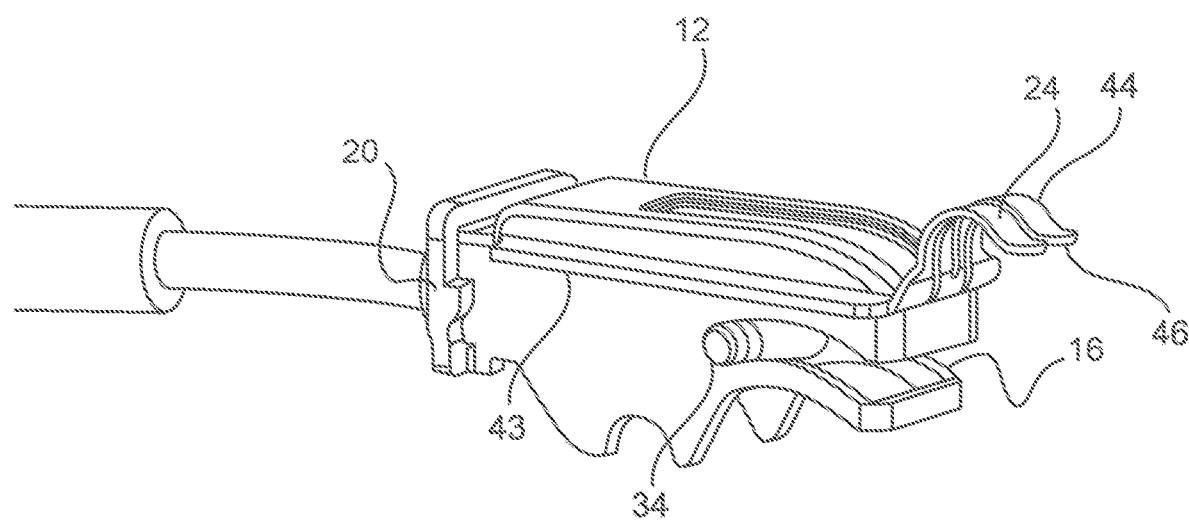
FIG. 5 shows a further perspective view of the example of FIG. 4.

FIG. 5 shows a further view of the Bowden cable end piece 10 of FIG. 4. The mounting spring 24 is configured as an option with two arcuately protruding segments. Instead, a one-piece arc segment may be provided, or another spring element shape.

Figure 6:
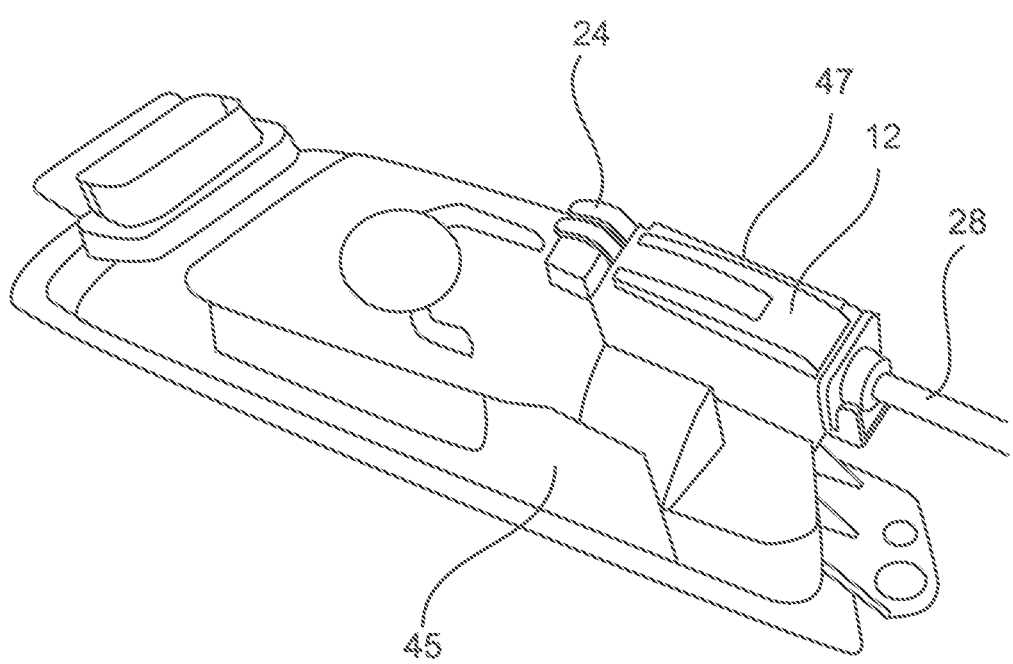
FIG. 6 shows a perspective view of an example of a door handle module with a Bowden cable end piece.

FIG. 6 shows a door handle module 45, which includes a receptacle 47 into which the Bowden cable end piece 10 is inserted. The mounting spring member 24 protrudes upward to abut in the assembled state on a mounting surface of a support structure of a motor vehicle door.

Figure 7:
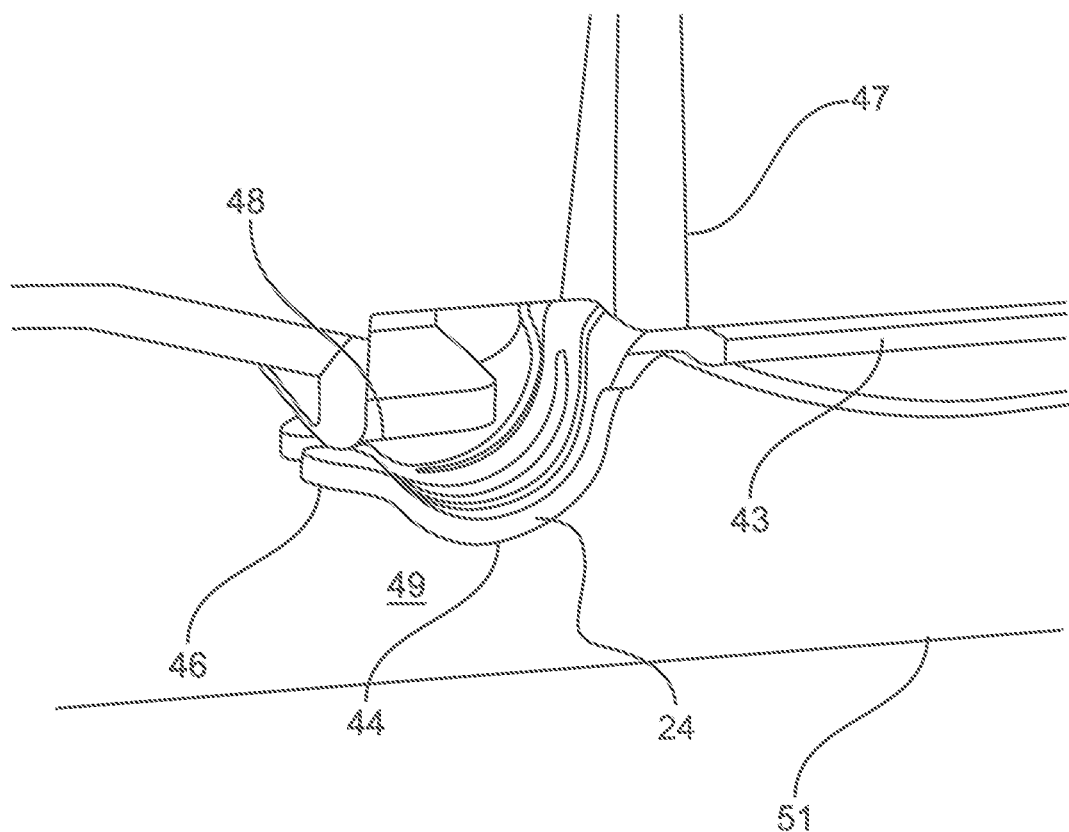
FIG. 7 shows a perspective view of a Bowden cable end piece in the end position when the mounting spring member abuts a mounting surface of a support structure of a motor vehicle door.

FIG. 7 shows a perspective view of a Bowden cable end piece in the end position when the assembly spring element abuts against a mounting surface 49 of a supporting structure (indicated by a line 51) of a motor vehicle door. In FIG. 7 it is shown as an option that the mounting spring 24 includes at its free end an abutment segment 46 which is pressed in the installed state by abutting of the mounting spring on a contact surface 48 on the door handle mechanism.

Figure 8:
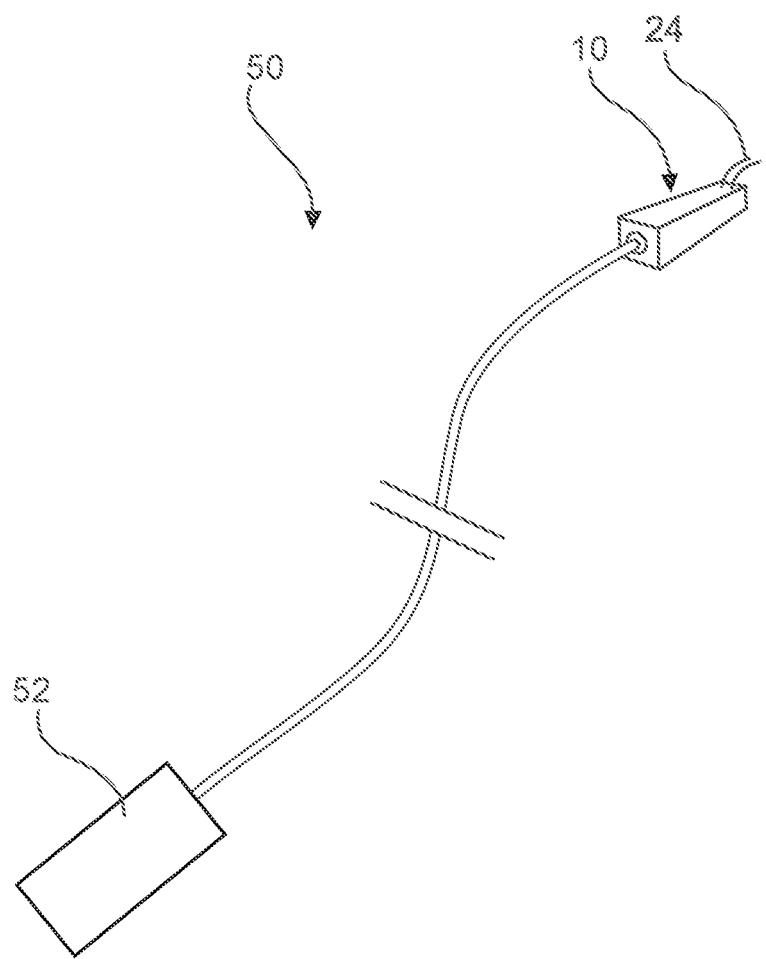
FIG. 8 shows a schematic view of a lock mechanism with a Bowden cable end piece.

FIG. 8 shows a lock mechanism 50 for a motor vehicle door. The lock mechanism 50 includes a motor vehicle door lock 52 and an example of the Bowden cable end piece 10. The Bowden cable of the Bowden cable end piece is connected at its end, which is opposite to the Bowden cable end piece, with the vehicle door lock.

Figure 9:
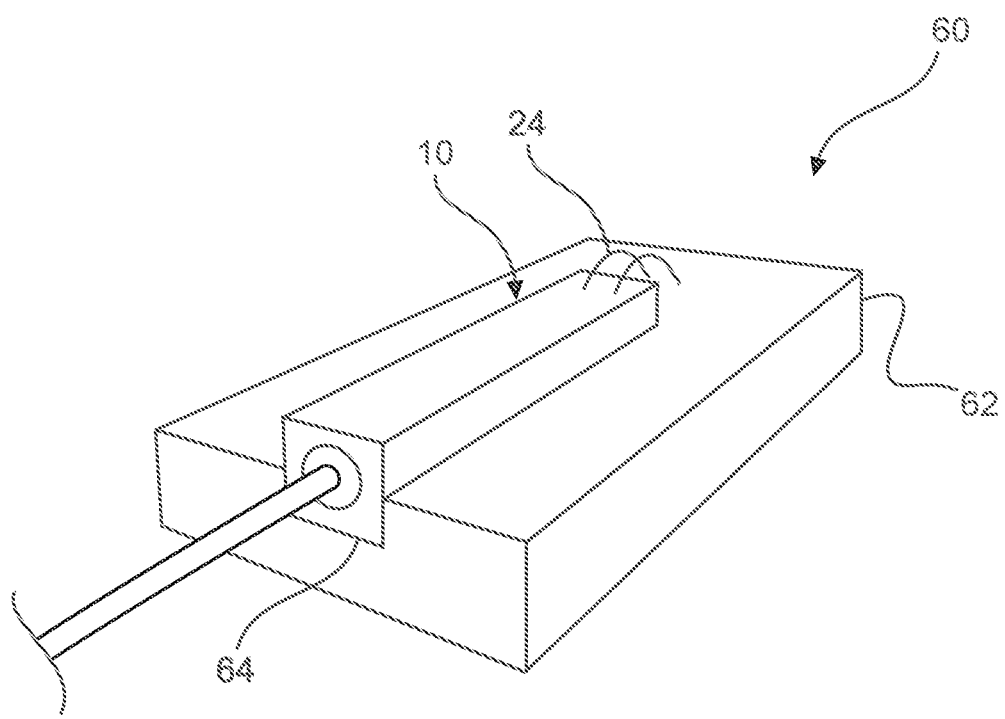
FIG. 9 shows a schematic view of a handle module with a Bowden cable end piece.

FIG. 9 shows a handle mechanism 60 for a motor vehicle door. The handle mechanism 60 includes a door handle mechanism 62 of a motor vehicle door and an example of the Bowden cable end piece 10. The Bowden cable end piece 10 is held captively to the door handle mechanism 62. In an example, it is provided that the Bowden cable end piece 10 is inserted into a receptacle 64 of the door handle mechanism. At the Bowden cable end piece 10 and/or the receptacle 64, a counter support is provided which forms a stop for the inserted Bowden cable end piece, wherein the stop defines the end position.

Figure 10:
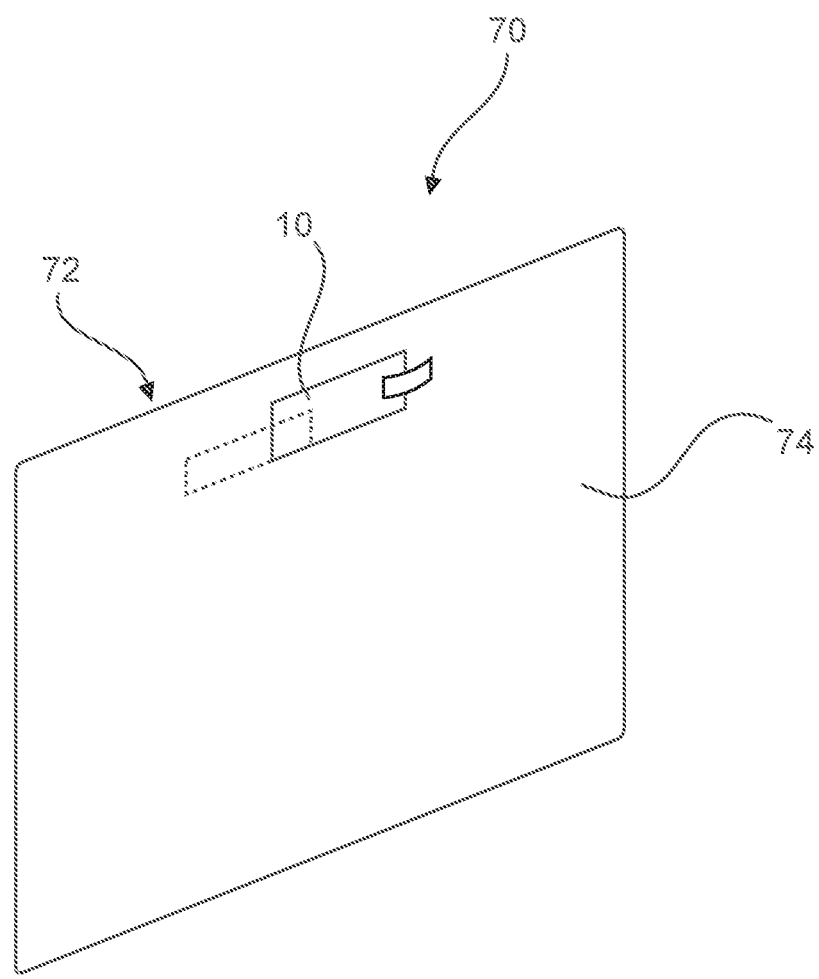
FIG. 10 shows a schematic view of an interior door liner with a Bowden cable end piece.

FIG. 10 shows an interior door liner 70 for a motor vehicle door. The interior door liner 70 includes a door handle mechanism 72, indicated by dashed lines, of a motor vehicle door and an interior lining segment 74 of a motor vehicle door. For simplicity, the interior lining segment 74 is shown as a flat element. It is noted that the interior lining segment 74 may have a three-dimensional surface contour, and may for example also be formed with storage compartments. The interior door liner 70 also includes an example of the Bowden cable end piece 10. The Bowden cable end piece 10 is held captively on the door handle mechanism 72. The door handle mechanism 72, in turn, is attached to the interior lining segment 74. The interior lining segment 74 may be mounted to a mounting side 76 on a flange-like mounting surface of a support structure of a motor vehicle door. The Bowden cable end piece 10 is inserted into a receptacle (not shown in detail) of the door handle mechanism 72 such that the mounting spring member 24 projects on the mounting side 76 of the Bowden cable end 10 piece to abut the mounting surface of the supporting structure of the motor vehicle door when mounting the interior lining segment 74.

Figure 11:
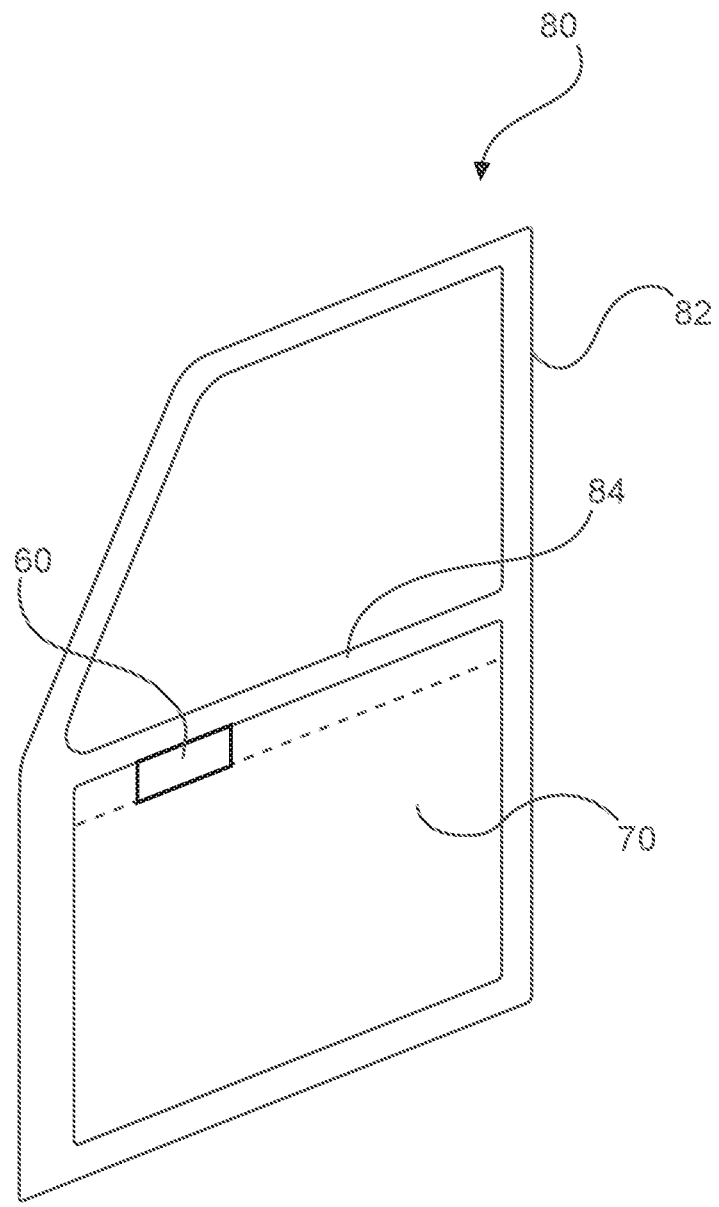
FIG. 11 shows a schematic view of a door module with a Bowden cable end piece.

FIG. 11 shows a door module 80 for a motor vehicle door. The door module 80 includes a support structure 82 of a motor vehicle door with at least one flange-like mounting surface 84. The door module 80 also includes an example of the interior door liner 70. The interior lining segment 74 is mounted to the flange mounting surface of the support structure. The mounting spring 24 abuts against the mounting surface and holds the Bowden cable end piece 10 in the end position.

Figure 12:
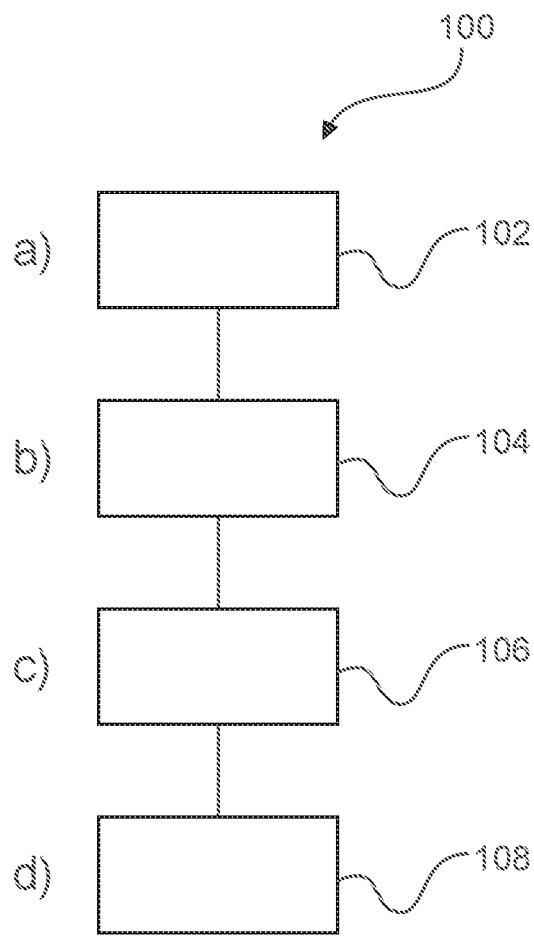
FIG. 12 shows steps of an example of a method of assembling a Bowden cable end piece for a vehicle door handle.

FIG. 12 shows a method 100 for mounting a Bowden cable end piece for a motor vehicle door handle.

A block 102, a Bowden cable with a sheath and a core with a barrel and a Bowden cable end piece is provided with an elongated support structure comprising a Bowden cable receptacle in which the sheath of the Bowden cable is held and through which the core of the Bowden cable extends, wherein the support structure includes a barrel guide, in which the barrel is held movably guided.

At block 104, the Bowden cable end piece is attached to a door handle mechanism in an insertion position with an attachment, which is provided at a first end portion of the support structure. The Bowden cable end piece is inserted into a receptacle of the door handle mechanism such that a mounting spring of the Bowden cable end piece protrudes from the Bowden cable end piece.

At block 106, the door handle mechanism is attached to an interior lining segment of a motor vehicle door. The mounting spring protrudes on a mounting side of the interior lining segment from the Bowden cable end piece.

At block 108, the interior lining segment is mounted with the mounting side on a flange-like mounting surface of a support structure of a motor vehicle door. In this case, the mounting spring abuts against the mounting surface and the Bowden cable end piece is held pressed in an end position.

The embodiments described above can be combined in different ways. In particular, aspects of the devices may also be used for the embodiments of the method and vice versa.

In addition, it should be noted that "comprising" does not exclude other elements or steps, and "a" or "an" does not exclude a multitude. It should also be appreciated that features or steps described with reference to any of the above embodiments may also be used in combination with other features or steps of other embodiments described above. Reference signs in the claims are not to be considered as limiting.

What is claimed is:

1. A Bowden cable assembly for a motor vehicle door lock assembly, the Bowden cable assembly comprising:
    a Bowden cable with a sheath and a core having a barrel at one end of the core;
    an end piece with an elongated support structure having a Bowden cable receptacle receiving one end of the sheath of the Bowden cable and guiding the core of the Bowden cable, and a barrel guide slidably supporting the barrel attached to the one end of the core;
    an attachment member disposed at a first end region of the elongated support structure configured to secure the end piece of the Bowden cable assembly to a door handle assembly of the vehicle door lock assembly, wherein the attachment member provides a holding connection with an operating mechanism of the motor vehicle door lock assembly for an insertion position and an end position; and
    a mounting spring disposed at a second end region opposite to the first end region, the mounting spring having an abutment region configured to pressably attach on a mounting surface of a support structure of a vehicle door when the Bowden cable assembly is in an assembled state.

2. The Bowden cable assembly according to claim 1, wherein the attachment member comprises a catch mechanism configured to captively attach the end piece in the insertion position at the door handle assembly.

3. The Bowden cable assembly according to claim 1, wherein the catch mechanism comprises a snap-fit mechanism.

4. The Bowden cable assembly according to claim 1, wherein the mounting spring is positionable in an installed state in a receptacle of the door handle assembly in a linear direction.

5. The Bowden cable assembly according to claim 4, wherein the mounting spring is relaxed when the end piece is inserted into the receptacle and is flexed in the installed state.

6. The Bowden cable assembly according to claim 4, wherein the mounting spring comprises an abutment segment at a free end thereof, which is configured to press against a contact surface of the door handle assembly in the installed state.

7. The Bowden cable assembly according to claim 1, wherein the mounting spring comprises an arcuately protruding segment extending from the end piece.

8. The Bowden cable assembly according to claim 1, wherein the operating mechanism comprises a door lock mechanism with the Bowden cable connected thereto for operating a door lock.

9. The Bowden cable assembly according to claim 1, wherein the operating mechanism comprises a door handle mechanism with the Bowden cable connected thereto for operating a door handle.

10. The Bowden cable assembly according to claim 9, wherein the Bowden cable end piece is inserted into a receptacle formed in the support structure of the door handle mechanism and the support structure forms a stop defining an end position for the inserted Bowden cable end piece.

11. The Bowden cable assembly according to claim 9, further comprising an interior door liner having a mounting side configured to be mounted to a motor vehicle door, wherein the door handle mechanism is attached to the interior door liner and the Bowden cable end piece is inserted into a receptacle formed in the support structure of the door handle mechanism such that the mounting spring protrudes on the mounting side from the Bowden cable end piece to abut on the mounting surface when the interior door liner is mounted.

12. The Bowden cable assembly according to claim 11, further comprising a door structure having at least one flange-like mounting surface, wherein the interior door liner is mounted to the flange-like mounting surface such that the mounting spring abuts on the mounting surface and holds the Bowden cable end piece pressed in the end position.

13. A Bowden cable assembly for a motor vehicle door lock assembly, the Bowden cable assembly comprising:
    a Bowden cable with a sheath and a core having a barrel at one end of the core;
    an end piece with an elongated support structure having a Bowden cable receptacle receiving one end of the sheath of the Bowden cable and guiding the core of the Bowden cable, and a barrel guide slidably supporting the barrel attached to the one end of the core;
    an attachment member disposed at a first end region of the elongated support structure configured to secure the end piece of the Bowden cable assembly to a door handle assembly of the vehicle door lock assembly, wherein the attachment member provides a holding connection with the door handle assembly, for an insertion position and an end position;
    a mounting spring disposed at a second end region opposite to the first end region, the mounting spring having an abutment region configured to pressably attach on a mounting surface of a support structure of a vehicle door when the Bowden cable assembly is in an assembled state;
    wherein the barrel guide forms a stop providing a defined position for the barrel in the end piece in a pulling direction of the Bowden cable.

14. The end piece Bowden cable assembly according to claim 13, wherein the stop provides the defined position for the barrel in the end piece in the pulling direction of the Bowden cable for a mounting step.

15. The Bowden cable assembly according to claim 13, wherein the end piece comprises a guide element for blind assembly of the end piece with the motor vehicle door lock assembly in a linear installation direction.

16. The Bowden cable assembly according to claim 13, wherein the mounting spring is configured to elastically deform to exert pressure on the end piece when the end piece is installed in the door handle assembly.

17. The Bowden cable assembly according to claim 13, wherein the barrel comprises an elongated member transversely extending at the end of the end of the core such that each end of the elongated member is slidably supported in the barrel guide.

18. A module comprising the Bowden cable assembly according to claim 13 and an operating mechanism for the motor vehicle door lock assembly, wherein an end of the Bowden cable opposite the end piece is operably coupled to the operating mechanism.

19. A method for assembling a motor vehicle door lock module comprising:
   inserting a Bowden cable into an end piece having an elongated support structure and a receptacle such that a sheath of the Bowden cable is held in the receptacle and a core of the Bowden cable is guided therethrough;
   positioning a barrel formed on an end of the Bowden cable core into a barrel guide formed in the elongated support structure;
   inserting the end piece into a receptacle formed in a support structure of a door handle assembly such that an attachment member on a first end portion of the elongated support structure provides a holding connection with the door handle assembly mechanism, for an insertion position;
   attaching the door handle assembly to an interior door liner, wherein a mounting spring on a second end portion of the elongated frame opposite the first end portion protrudes from the end piece on a mounting side of the interior door liner; and
   attaching the mounting side of the interior door liner to a flange-like mounting surface of a support structure of a vehicle door such that the mounting spring abuts the mounting surface and the Bowden cable end piece is held pressed in the end position.

20. The method according to claim 19, wherein the barrel guide forms a stop providing a defined position for the barrel in the end piece in a pulling direction of the Bowden cable.

\* \* \* \* \*